United States Patent [19]

Weston

[11] Patent Number: 5,434,627
[45] Date of Patent: Jul. 18, 1995

[54] CODEC FOR WESTON CLEAN PAL TELEVISION SYSTEM

[75] Inventor: Martin Weston, Petersfield, United Kingdom

[73] Assignee: British Broadcasting Corporation, London, England

[21] Appl. No.: 927,414

[22] PCT Filed: Jan. 24, 1992

[86] PCT No.: PCT/GB92/00146
§ 371 Date: Nov. 16, 1992
§ 102(e) Date: Nov. 16, 1992

[87] PCT Pub. No.: WO92/13426
PCT Pub. Date: Aug. 6, 1992

[30] Foreign Application Priority Data
Jan. 24, 1991 [GB] United Kingdom ............ 9101536

[51] Int. Cl.$^6$ ............................................ H04N 11/16
[52] U.S. Cl. ........................................ 348/609; 348/665
[58] Field of Search ............... 348/609, 610, 663, 665, 348/666, 667, 668, 669, 670, 724, 727; 358/328, 329; H04N 5/21, 11/14, 9/78, 11/16

[56] References Cited

U.S. PATENT DOCUMENTS

| | | | |
|---|---|---|---|
| 4,291,331 | 9/1981 | Devereux | 358/13 |
| 4,597,007 | 6/1986 | Reitmeier et al. | 348/670 |
| 4,638,351 | 1/1987 | Clarke | 348/610 |
| 4,683,490 | 7/1987 | Strolle et al. | 348/609 |
| 5,333,014 | 7/1994 | Drewery et al. | 348/663 |

FOREIGN PATENT DOCUMENTS

| | | | |
|---|---|---|---|
| 1534268 | 11/1978 | United Kingdom | H04N 9/39 |
| 1534269 | 11/1978 | United Kingdom | H04N 9/39 |
| 1534270 | 11/1978 | United Kingdom | H04N 9/39 |
| 2044577 | 10/1980 | United Kingdom | H04N 9/39 |
| 2137845 | 10/1984 | United Kingdom | H04N 9/39 |

OTHER PUBLICATIONS

C. K. P. Clarke, "Pal Decoding: Multi-Dimensional Filter Design For Chrominance-Luminance Separation", *BBC Research Department Report*, No. 11, (1988), pp. 1-25.
The British Broadcasting Corporation Research Department Report 1980/1.

*Primary Examiner*—James J. Groody
*Assistant Examiner*—Chris Grant
*Attorney, Agent, or Firm*—Kevin J. Fournier

[57] ABSTRACT

Cross talk between luminance and chrominance is eliminated in a Weston Clean PAL codec by replacing the band pass filter used in a conventional codec with a high pass filter (L) and introducing a compensating low pass filter (X) into the chrominance path, the filters being chosen such that $L = 4F'*(1-F')$ and $X(f) = (F'(f):(1-F'(f))$ where $F' = F(2fsc-f)$ and L is a low pass (5.5 MHz) filter 248 applied before transmission in the PAL channel.

14 Claims, 9 Drawing Sheets

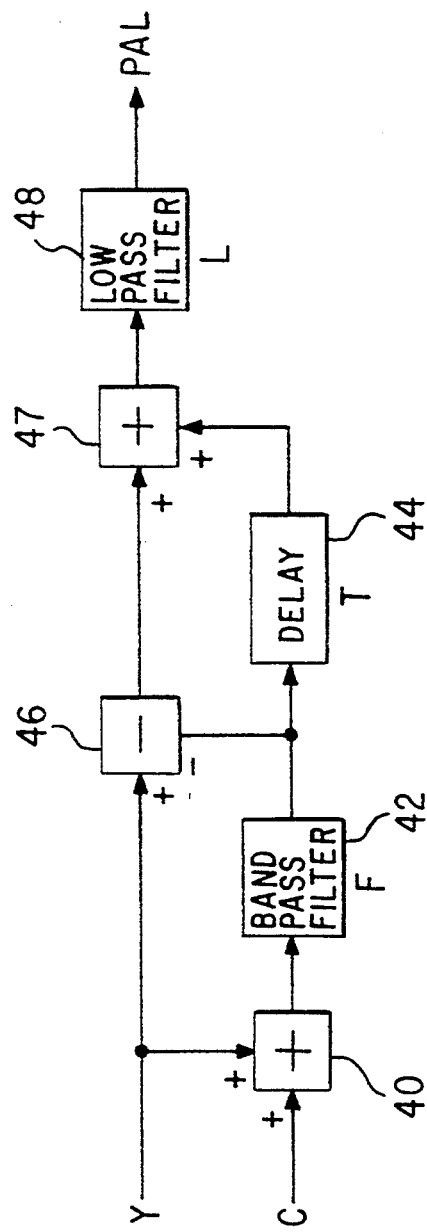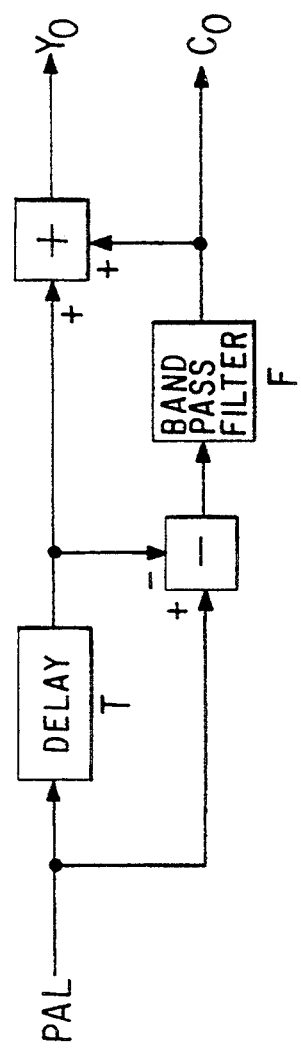
FIG. 3(a) PRIOR ART
FIG. 3(b) PRIOR ART

— — OVERALL
——— SIGNAL
- - - ALIAS

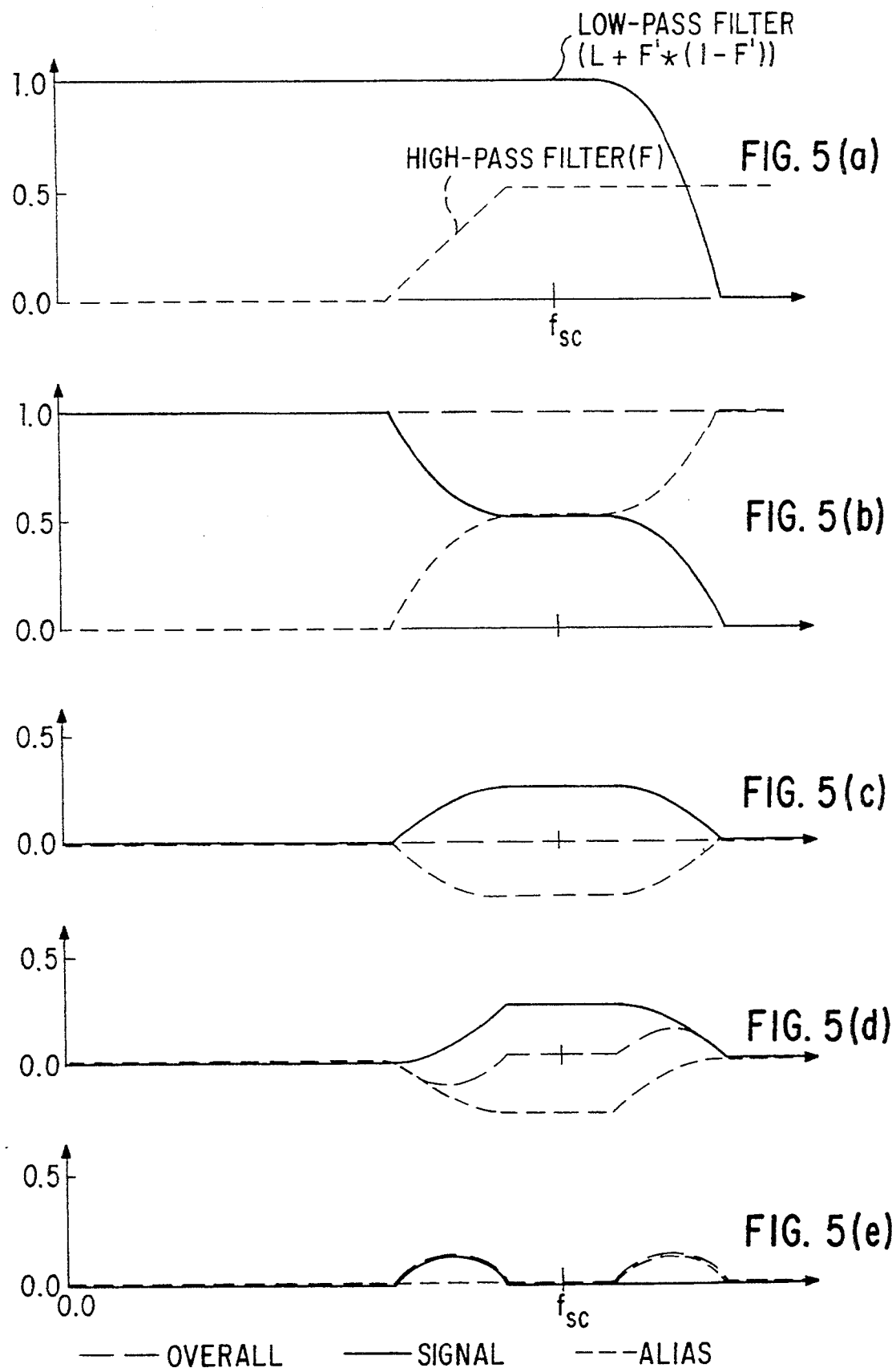

— — OVERALL
——— SIGNAL
— — — ALIAS

— — OVERALL
——— SIGNAL
– – – ALIAS

CODEC FOR WESTON CLEAN PAL TELEVISION SYSTEM

FIELD OF THE INVENTION

This invention relates to the Weston Clean PAL (W-PAL) video signal and in particular the design of practically realisable assembler and splitters in a W-PAL system.

BACKGROUND TO THE INVENTION

The W-PAL coding and decoding system (also known as Weston Clean PAL) is described in GB 15343268, GB1534269 and GB1534270 and in BBC Research Department Report 1980/1 February 1980 all of which are incorporated herein by reference. It is a form of "clean PAL" which uses comb-filters and modulation of the luminance at a frequency of twice sub-carrier (2fsc), to reduce cross talk between the luminance and chrominance signals.

All W-PAL systems, proposed, contain a band-pass filter which limits the action of the comb filter to the sub-carrier band (approx. 3.3 to 5.5 MHz) for system I PAL. Cross Talk is completely eliminated at all frequencies within this band, where the band-pass filter has unity gain, and also at all frequencies outside the band, where the filter has zero gain. But some cross talk remains in the transition band, where the response is neither unity nor zero.

SUMMARY OF THE INVENTION

The invention aims to reduce or eliminate this residual cross talk between luminance and chrominance signals.

The invention is defined by the independent claims to which reference should now be made.

In essence, the invention replaces the band-pass filter with a high-pass filter and introduces a further filter to compensate for the unbalance between the various signal paths in the transition band.

Other advantageous features of the invention are set out in the dependent claims.

DESCRIPTION OF DRAWINGS

Embodiments of the invention will now be described, by way of example, and with reference to the accompanying drawings in which:

FIG. 3a) is a block schematic diagram of a conventional W-PAL assembler;

FIG. 3b) is a block schematic diagram of a conventional W-PAL splitter;

FIGS. 5a) to e) shows frequency responses under the same conditions with the band-pass filter replaced by a high-pass filter;

DESCRIPTION OF BEST MODE

Figure 1A:
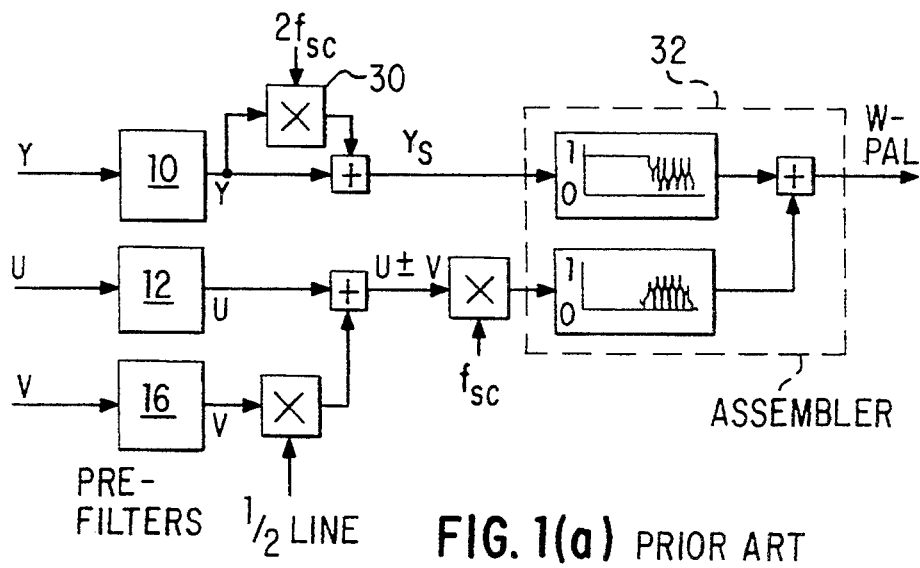
FIGS. 1a) and 1b) are, respectively, block schematic diagrams of a Weston Clean PAL (W-PAL) coder and decoder.
Figure 1B:
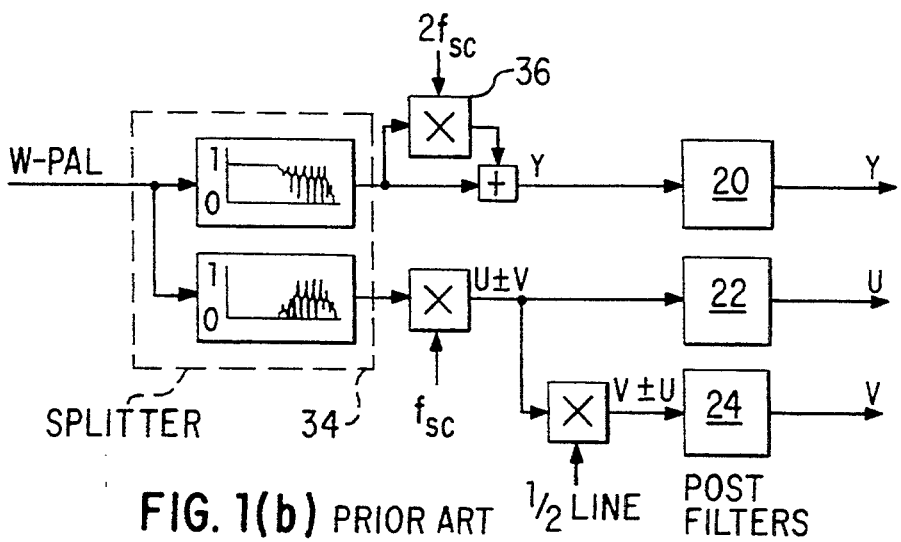

FIGS. 1(a) & (b) are overall block diagrams of the W-PAL coder and decoder. In the coder, the incoming luminance signal (Y) and the two chrominance signals (U & V) are separately pre-filtered, at 10, 12, 14 and in the decoder, the outgoing Y,U&V signals are separately post-filtered at 20, 22, 24. These pre and post filters determine the overall characteristics of the system, but they have no effect whatsoever on the cross-talk. So they may be ignored for the sake of the current analysis.

Similarly the combination of the two chrominance signals into a single signal (C=U+V/U−V) which is a feature of W-PAL creates cross-talk between the two chrominance signals (which is reduced by the pre & post filters). But this combination has no effect on the cross-talk between luminance and chrominance, and so may also be ignored.

Figure 2:
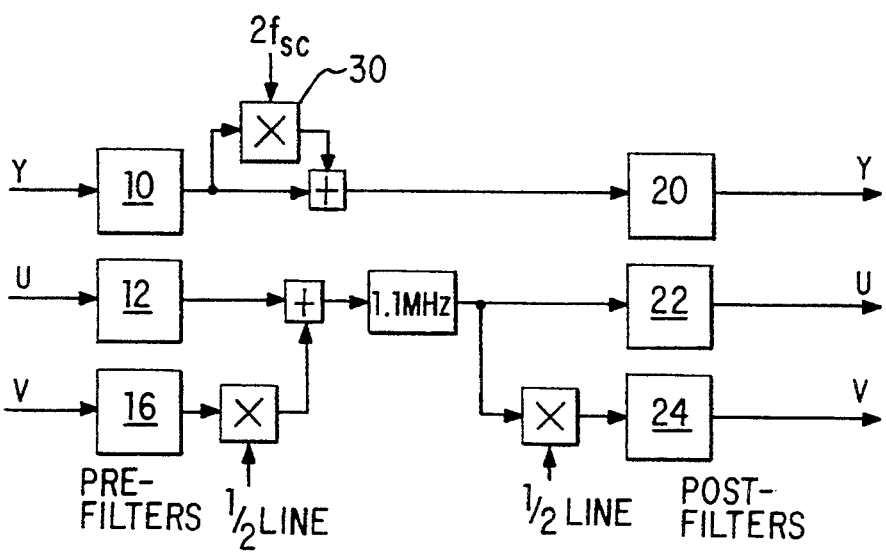
FIG. 2 is a block diagram of an ideal W-PAL system wholly eliminating cross-talk.

This only leaves the 2fsc modulation shown at 30, assembler 32, splitter 34, and re-modulator 36 as contributing to cross-talk. We would like these to be equivalent to a single modulator in the luminance path, and a band-pass filter in the chrominance path. The overall system then would be equivalent to that shown in FIG. 2, in which cross-talk is clearly impossible.

The following description shows how this equivalence may be achieved by careful design of the assembler and splitter.

ASSEMBLER AND SPLITTER

FIG. 3 shows the block diagram of the assembler and splitter, as described in all previous papers, for example in BSC Research Department Report 1980/1 and GB1534269 referred to previously. In the figure the Y and C signals are summed at 40 and filtered by band pass filter 42. The output is delayed by one video line at delay 44 and also subtracted from the unfiltered luminance Y(t) by subtractor 46. The output of the subtractor 46 and the output of the delay 42 are summed by adder 47 and filtered by 5.5 MHz low pass filter 48 to form the W-PAL signal. At the splitter the received signal is delayed by line delay 50 and both the delayed and undelayed signals input to subtractor 52. The output of the subtractor is band pass filtered by filter 54 to provide Co and that output added by adder 56 to the delayed signal to provide Yo. In practice equalising delays are also included to match delays caused by the filters. In practice there would be two separate (5.5 MHz) low-pass filters at the coder and decoder, but to simplify the analysis these have been lumped together in L. A gain factor of $\frac{1}{2}$ has also been lumped into the band-pass filter F.

From FIG. 3 it can be seen that the output from the assembler (PAL) is given by:

$$PAL(t)=L*\{Y(t)+F*[Y(t-T)-Y(t)+C(t-T)-C(t)]\} \quad [1]$$

(where * represents convolution).

The luminance ($Y_0$) and chrominance ($C_0$) outputs of the splitter are given by;

$$Y_0(t) = PAL(t-T) + F^*[PAL(t) - PAL(t-T)] \quad [2]$$

$$C_0(t) = F^*[PAL(t) - PAL(t-t)] \quad [3]$$

Substituting [1] into [2] & [3], and collecting terms, given:

$$\begin{aligned}Y_0(t) = L^*\{&[F - F^*F] * Y(t) + \\ &[1 - 2F + 2F^*F] * Y(t - T) + \\ &[F - F^*F] * Y(t - 2T) + \\ &[-F^*F] * C(t) + \\ &[-F + 2F^*F] * C(t - T) + \\ &[F - F^*F] * C(t - 2T)\}\end{aligned} \quad [4]$$

$$\begin{aligned}C_0(t) = L^*\{&[F - F^*F] * Y(t) + \\ &[-F + 2F^*F] * Y(t - T) + \\ &[-F^*F] * Y(t - 2T) + \\ &[-F^*F] * C(t) + \\ &[+2F^*F] * C(t - T) + \\ &[-F^*F] * C(t - 2T)\}\end{aligned} \quad [5]$$

For low frequencies (where L=1 & F=0) these expressions simplify to:

$$Y_0(t) = Y(t-T) \quad [6]$$

&

$$C_0(t) = 0 \quad [7]$$

so there is no cross-talk at low frequencies.

In the pass-band of F (where L=1 & F=0.5) they simplify to:

$$\begin{aligned}Y_0(t) = \;&0.25 * Y(t) + \\ &0.5 * Y(t - T) + \\ &0.25 * Y(t - 2T) + \\ &-0.25 * C(t) + \\ &0.0 * C(t - T) + \\ &0.25 * C(t - 2T)\end{aligned} \quad [8]$$

$$\begin{aligned}C_0(t) = \;&0.25 * Y(t) + \\ &0.0 * Y(t - T) + \\ &-0.25 * Y(t - 2T) + \\ &-0.25 * C(t) + \\ &0.5 * C(t - T) + \\ &-0.25 * C(t - 2T)\end{aligned} \quad [9]$$

Thus the luminance and chrominance outputs of the splitter each contain a mixture of luminance and chrominance components from three successive input lines.

But re-modulating the luminance output, in the correct phase, adds a set of alias components which doubles the Y(t−T) term, and cancels the Y(t), Y(t−2T), C(t) & C(t−2T) terms. Actually, to achieve this the delay must be exactly 1135/2 cycles of 2fsc, which is 63.999639 micro-seconds, rather than an exact line. So achieving this delay digitally using line locked sampling ideally requires a horizontal interpolator. But since the shift is only 0.361 nano-seconds, it's probably not worth the bother.

Similarly the demodulation of the chrominance cancels the unwanted Y(t), Y(t−2T), C(t) & C(t−2T) components.

This cancellation will only occur in the transition bands (where 0<F<0.5) if the aliases correctly match the original. Since re-modulation of the luminance, and demodulation of the chrominance both invert the spectrum, the following 4 conditions must be satisfied:

1) To regenerate the Y(t) term in [4], L*[1−2F+2F*F] must be skew symmetric:

$$L^*[1-2F+2F-F] + L'^*[1-2F+2F^*F] = 1 \quad [10]$$

(where L'(f)=L(2fsc−f), & F'(f)=F(2fsc−f))

2) To cancel the Y(t), Y(t−2F) & C(t−2T) terms in [4], and the Y(t) term in [5], L*[F−F*F] must be symmetrical:

$$L^*[F-F^*F] - L'^*[F-F^*F] = 0 \quad [11]$$

3) To cancel the C(t) term in [4], and the Y(t−2T), C(t) & C(t−2T) terms in [5], L*F*F must be symmetrical:

$$L^*F^*F - L'^*F^*F = 0 \quad [12]$$

4) To eliminate or cancel the C(t) term in [4], and the Y(t) term in [5], L[F−2F*F] must be zero or point symmetric:

$$L^*[F-2F^*F] + L'^*[F-2F^*F] = 0 \quad [13]$$

Figure 4A:
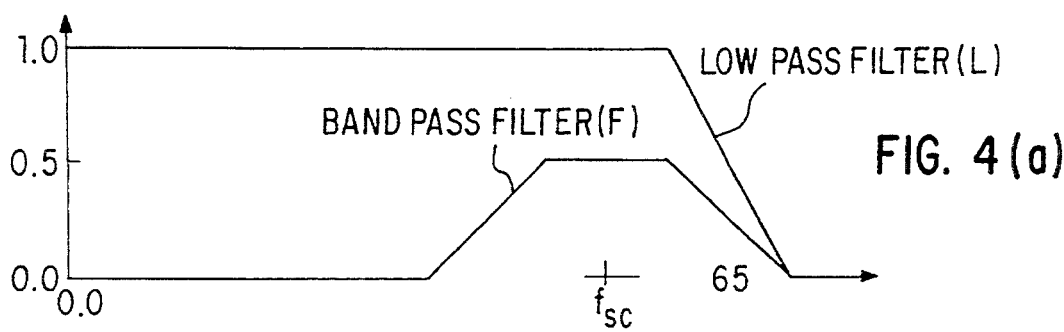
FIGS. 4a) to e) shows frequency responses under certain conditions of the band pass filter of FIG. 3.
Figure 4B:
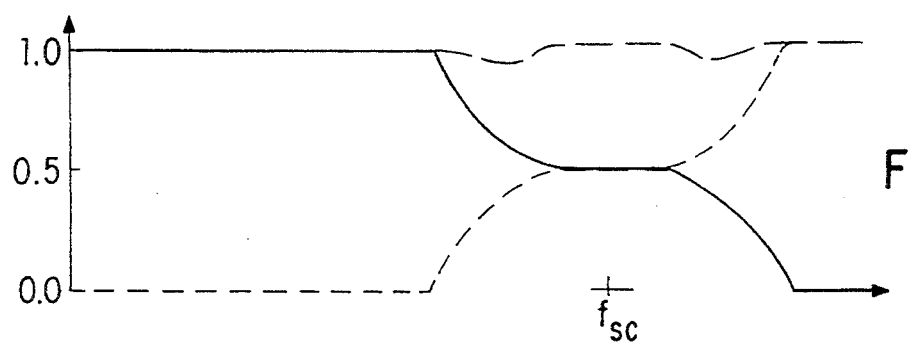
Figure 4C:
Figure 4D:
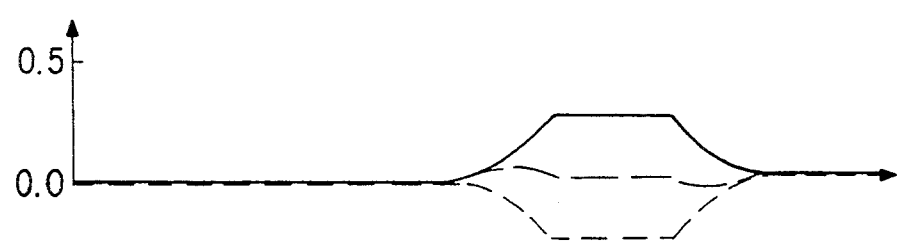
Figure 4E:
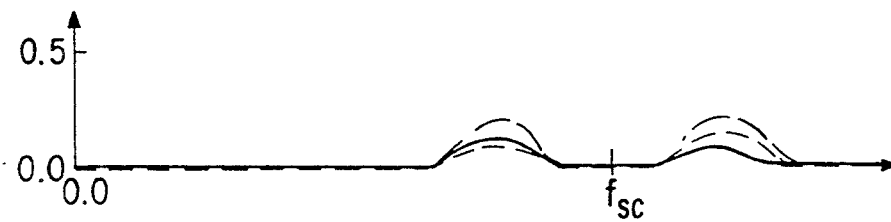

Unfortunately it is not possible to satisfy any of these conditions if F is a symmetrical band-pass filter. For example FIG. 4 illustrates the overall responses for the case of a band-pass filter whose high frequency cut-off matches that of the low-pass filter L. None of the responses is correct. FIG. 4a) illustrates the cut off frequencies of filters L (low pass) and F (band pass). FIGS. 4b) to e) show the responses under the four conditions.

However, if the band-pass filter is replaced by a high-pass filter conditions (1) & (2) can be satisfied by:

$$L = 4.F^*(1-F) \quad [14]$$

This is illustrated by FIG. 5, which shows that conditions (1) & (2) are satisfied but (3) & (4) are not! In fact condition (3) is considerably worse and condition (4) only slightly better.

However, we have appreciated that this problem can be solved by adding an extra filter X to the chrominance paths in the assembler and splitter. So that:

$$\begin{aligned}PAL(t) = L^*\{&Y(t) + F^*[Y(t - T) - Y(t) + \\ &C(t - T) - X^*C(t)]\}\end{aligned} \quad [15]$$

$$Y'(t) = PAL(t - T) + F^*[PAL(t) - PAL(t - T)] \quad [16]$$

$$C'(t) = F^*[PAL(t) - X^*PAL(t - T)] \quad [17]$$

$$\begin{aligned}Y'(t) = L^*\{&[F - F^*F] * Y(t) + \\ &[1 - 2F + 2F^*F] * Y(t - T) + \\ &[F - F^*F] * Y(t - 2T) + \\ &[-X^*F^*F] * C(t) + \\ &[-X^*F + (1 + X)^*F^*F] * C(t - T) + \\ &[F - F^*F] * C(t - 2T)\}\end{aligned} \quad [18]$$

$$\begin{aligned}C'(t) = L^*\{&[F - F^*F] * Y(t) + \\ &[-X^*F + (1 + X)^*F^*F] * Y(t - T) + \\ &[-X^*F^*F] * Y(t - 2T) + \\ &[-X^*F^*F] * C(t) + \\ &[(1 + X^*X)F^*F] * C(t - T) + \\ &[-X^*F^*F] * C(t - 2T)\}\end{aligned} \quad [19]$$

The conditions for transparancy are now:

1) L*[1−2F+2F−F] must be anti-symmetric, as before.
2) L*[F−F*F] must be symmetric, as before.
3) L*X*F.F must be symmetric
4) L*[X*F−(1+X)F*F] must be point-symmetric Conditions [1] & [2] are the same as before, which is just as well since they have already been satisfied by equation [14]. Conditions [3] and [4] can be satisfied by:

$$X(f)=F(f)/[1-F(f)] \qquad [20]$$

Where $F'(f)=F(2fsc-f)$

FIG. 6 illustrates the resulting responses.

Figure 6A:
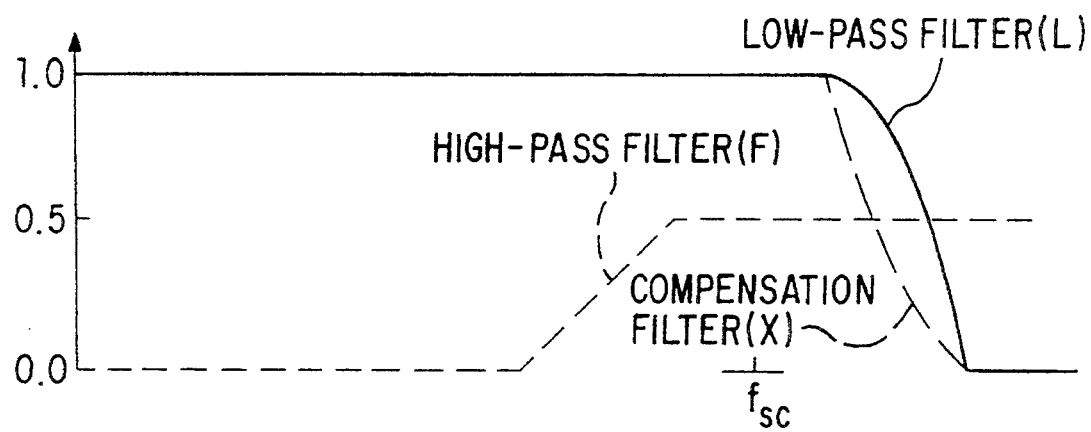
FIGS. 6a) to g) shows frequency responses for a compensated high-pass filter.
Figure 6B:
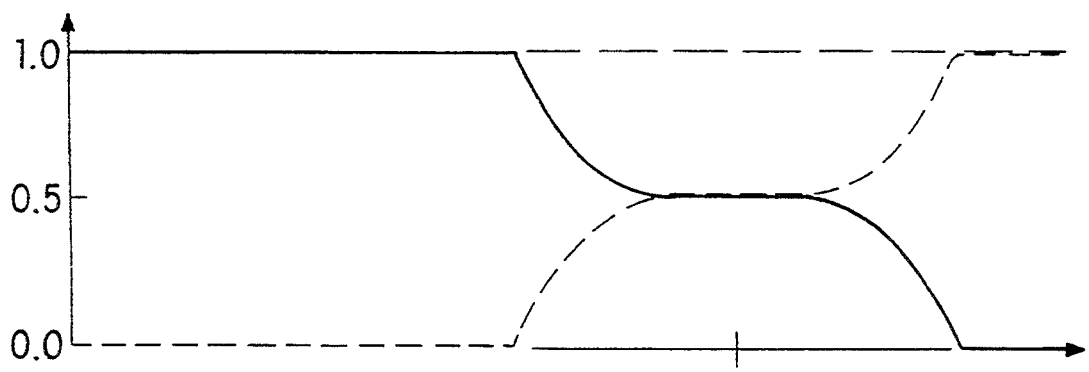
Figure 6C:
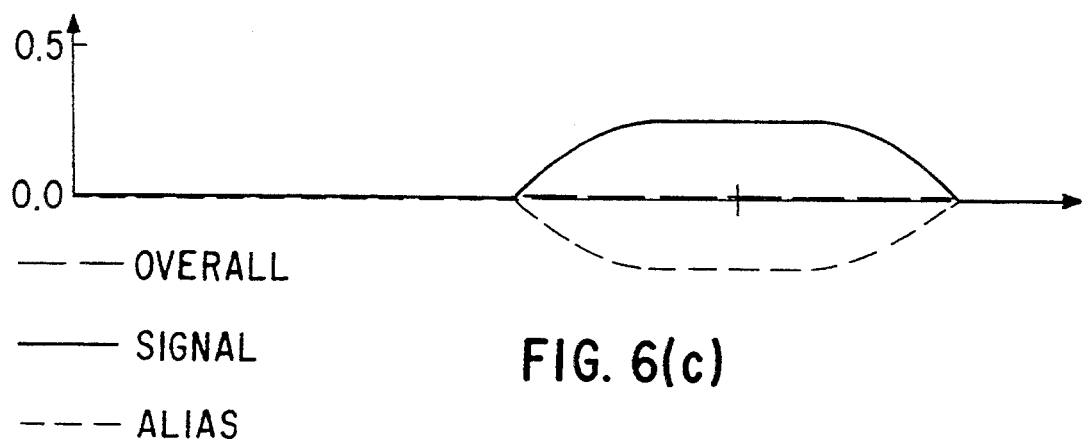
Figure 6D:
Figure 6E:
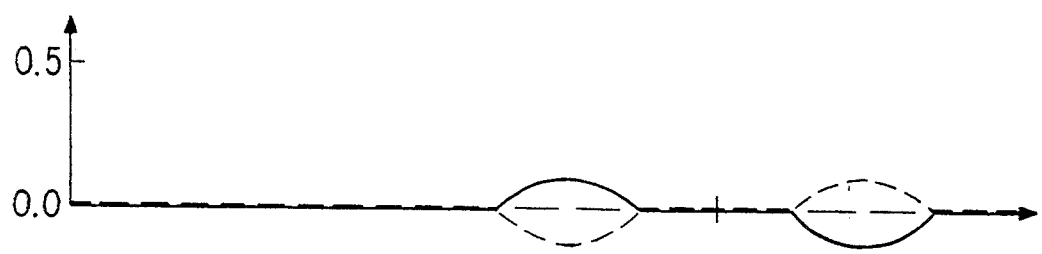
Figure 6F:
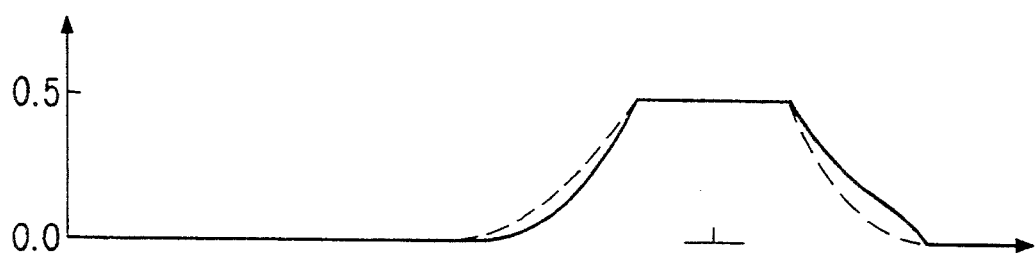
Figure 6G:

The overall chrominance channel response is which is shown in FIG. 6(f), and the effective base-band response, after demodulation, in FIG. 6(g). All of these figures have been drawn with F having a straight line transition band, but of course any shape could have been used provided F, L & X satisfy equations [14] & [20]. It is thus possible to adjust the shape of the chrominance response as required, for example to ensure transparency of spectrally folded chrominance signals.

IMPLEMENTATION

Figure 7A:
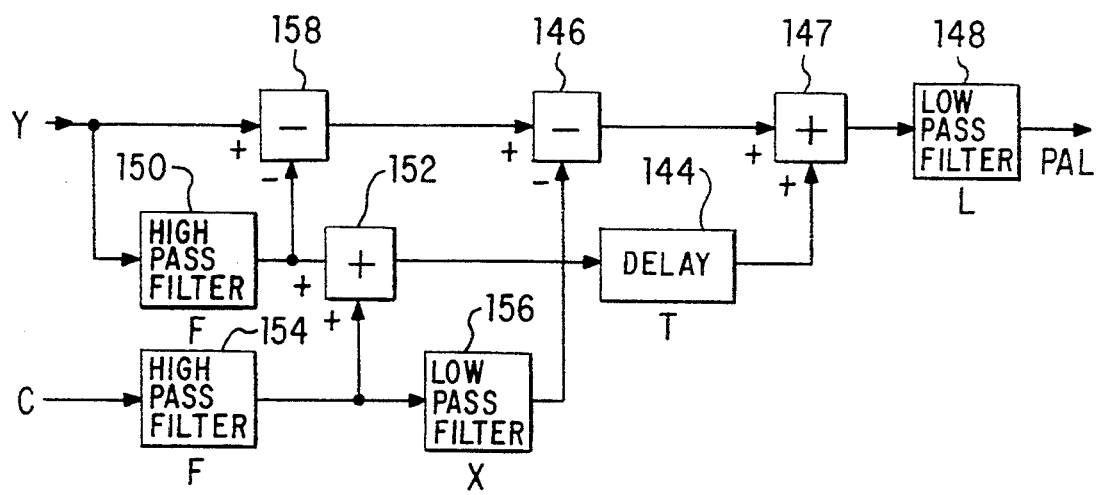
FIGS. 7a) and b) show, respectively, implementations of the W-PAL assembler and splitter for the filter of FIG. 6.
Figure 7B:
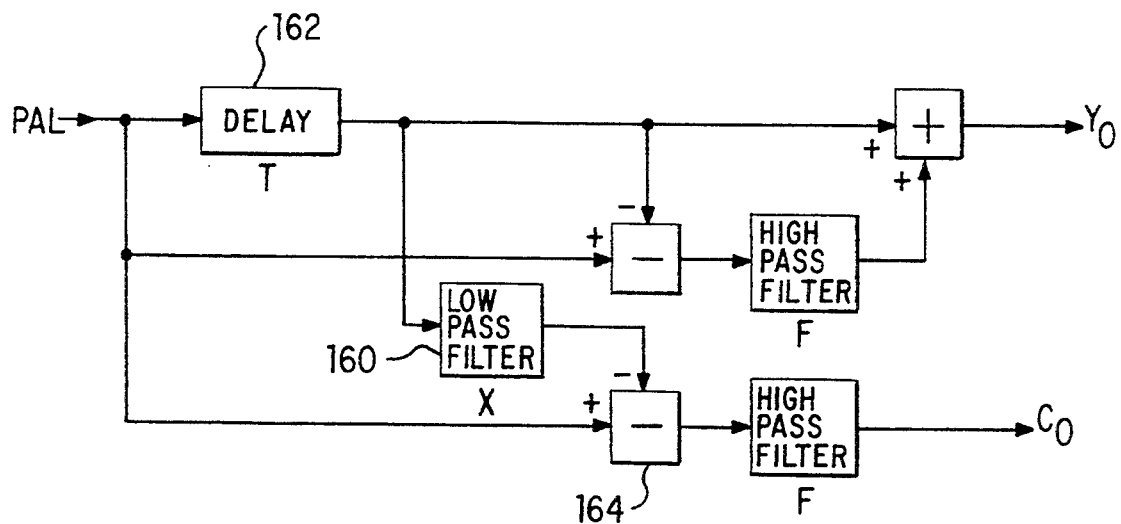
Figure 8A:
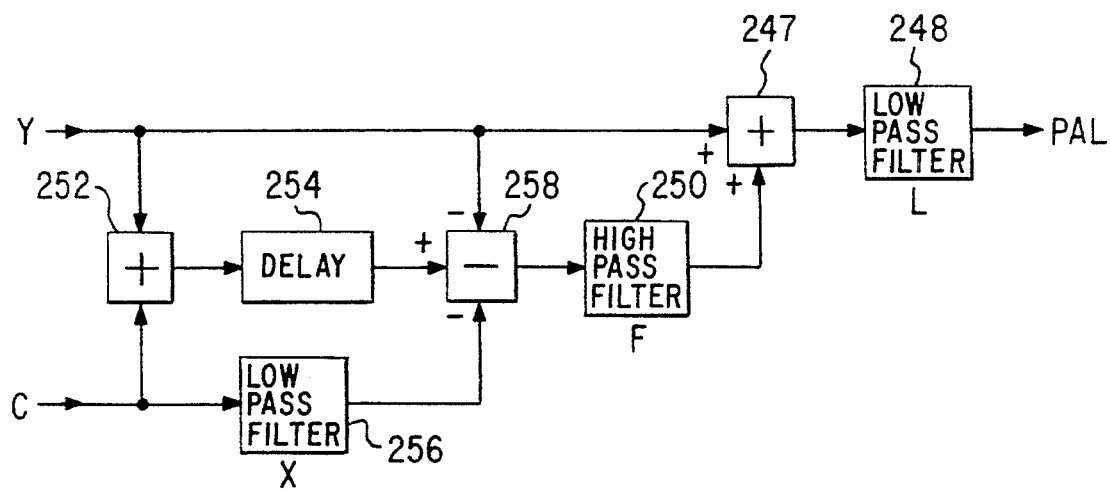
FIGS. 8a) and b) show, respectively, an alternative implementations of the assembler and splitter to that shown in FIG. 7.
Figure 8B:
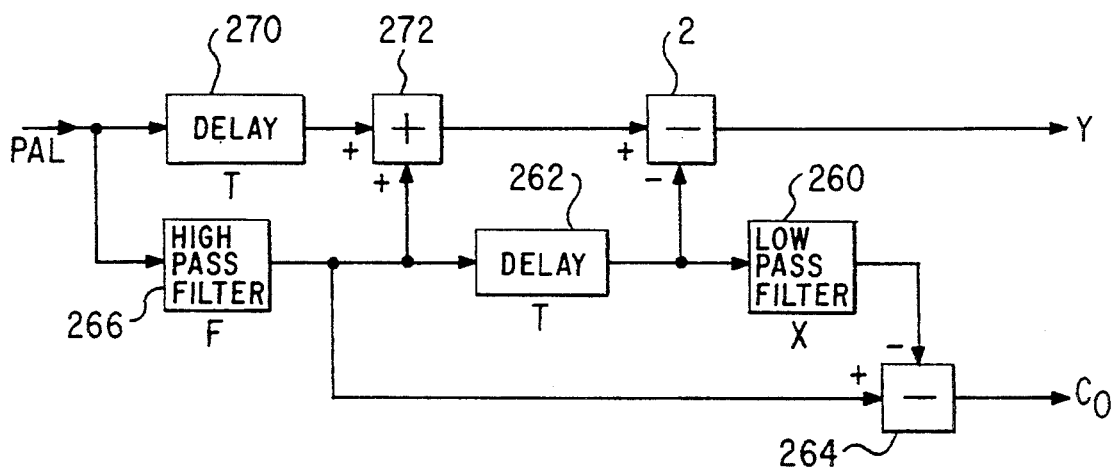

FIGS. 7(a) & 7(b) show block diagrams of the assembler and splitter, incorporating the extra compensating filter X, according to equations [15] [16] & [17]. These require the high-pass filter to be duplicated. FIGS. 8(a) & 8(b) show an alternative arrangement where the filter F is not duplicated, although the splitter requires 2 line delays T. This would probably be cheaper to implement, since nowadays digital delays are cheaper than filters.

Considering FIG. 7 in more detail the assembler has a subtractor 146, an adder 147, a delay 144 and low pass filter 148 in common with the conventional W-PAL assembler shown in FIG. 3a).

The input to the line delay 144 is the luminances signal filtered by high pass filter F, 150 and added in adder 152 to the chrominance signal filtered by high pass filter F, 154. Thus the filter F must be repeated for the Y and C signals.

The additional low pass filter X, 156 is applied to the chrominance signal after the high pass filter. The output X*F*C(t) forms the negative input to subtractor 146. The positive input to this subtractor is provided by the luminance signal filtered by high pass filter F, 150 subtracted in subtractor 158 from the unfiltered luminance signal Y thus, the output of subtractor 146 is Y(t)−−F*Y(t)−[X*F*C(t)] and this forms an input to adder 147 whose other input is F*[Y(t−T)+C(t−T)].

Thus the PAL output corresponds to:

L*Y(t)+F*[Y(t−T)−Y(t)+C(t−T)−X*C(t)]> which corresponds to equation 15.

In the splitter, the design is identical to that of FIG. 3b) with the addition of low pass filter X, 160 between line delay 162 applied to the received W-PAL signal and subtractor 164 which subtracts PAL (t−T) from PAL (t).

Referring now to FIG. 8, the inputs to adder 247 prior to filter L, 248 are the unprocessed luminance signal Y(t) and the output of high pass filter F250. Adder 252 adds Y(t) and and C(t) which is then delayed by one line in delay 254 to produce Y(t−T)+C(t−T). The chrominance signal is filtered by low pass filter X, 256 and subtracted from the delayed signal together with Y(t) at subtractor 258 whose output is therefore Y(t−T)+C(t−T)−Y(t)−X*C(t). This is filtered by filter F, 250 such that the output prior to filter L, 248 is:

Y(t) +F*[Y(t−T)+C(t−T)−Y(t)−X*C(t)]

which after filtering in filter 248 satisfies equation 15.

The corresponding splitter shown in FIG. 8b) includes the additional low pass filter X, 260 after line delay 262 and before subtractor 264 which subtracts the received PAL signal filtered by filters F, 266 and X 260 from the undelayed signal filtered by high pass filter F, 266. Thus, the chrominance output is:

$$C_0 = F*PAL\ (t) - X*F*PAL(t-T)$$

To provide the luminance output, subtractor 268 subtracts F*PAL (t−T) from PAL (t−T) (delayed at 270)+F* PAL (t), added at adder 272. Thus, the output luminance $Y_0$ is:

$$PAL(t-T)+F*\ PAL\ (t)-F*\ PAL\ (t-T)$$

or $$Y_0 = PAL\ (t-T)+F*\ (PAL\ (t)-PAL\ (t-T))$$

Thus, the luminance and chrominance outputs agree with equations 16 and 17.

FILTER COEFFICIENTS

Table 1 (at the end of the description) gives coefficients for a set of digital filters designed to operate at a sampling frequency of 13.5 MHz.

The design process started by designing F & 2F'. These are both 49 tap FIR filters with raised cosine edges 1.0 MHz wide (0–100%). F is high-pass with a 6 db cut-off of 3.3367 MHz (2fsc–5.5MHz) and a gain of 0.5. 2F' is low-pass with a cut off of 5.5 MHz.

A correction filter C (=2−2F') was derived by subtracting 2F' from 2. The system low-pass filter L (=2F'*[2−2F']=2F*C) was derived by filtering 2F' with C. This gives a 97 tap filter.

The low pass compensating filter X (=2F'/[2−2F']=2F'/C) was derived by computing 97 point frequency responses of 2F' & C dividing 2F' (f) by C(f) and then performing the inverse Fourier transform. (This process does not guarantee to give the correct response at other than the 97 frequencies used, but it is probably close enough for all practical purposes).

Figure 9:
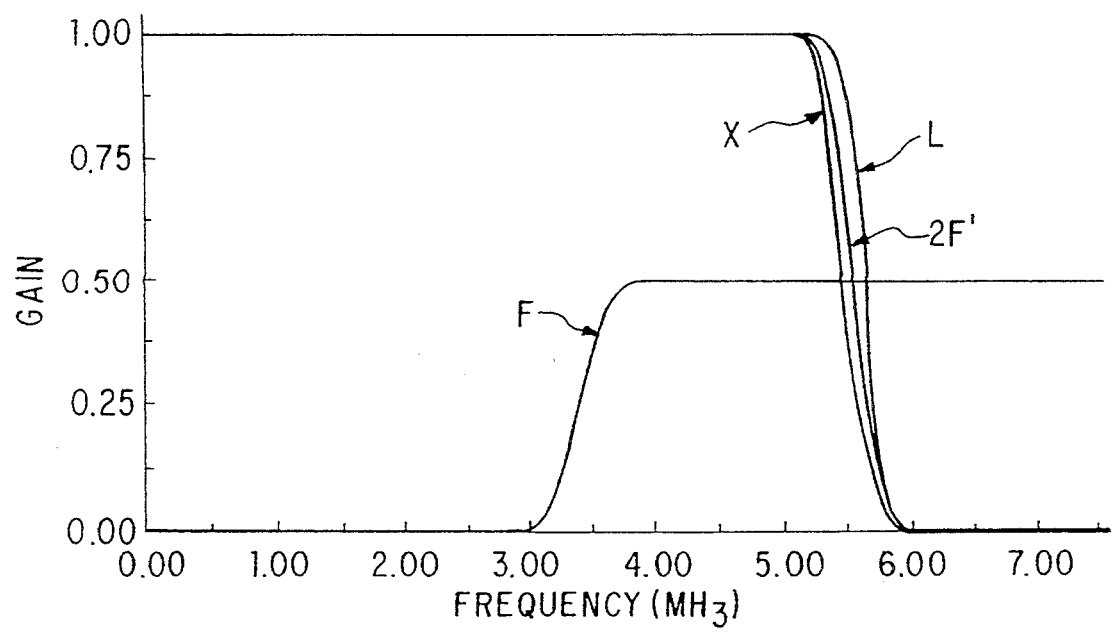
FIG. 9 shows frequency responses for the individual components of a practical filter.
Figure 10:
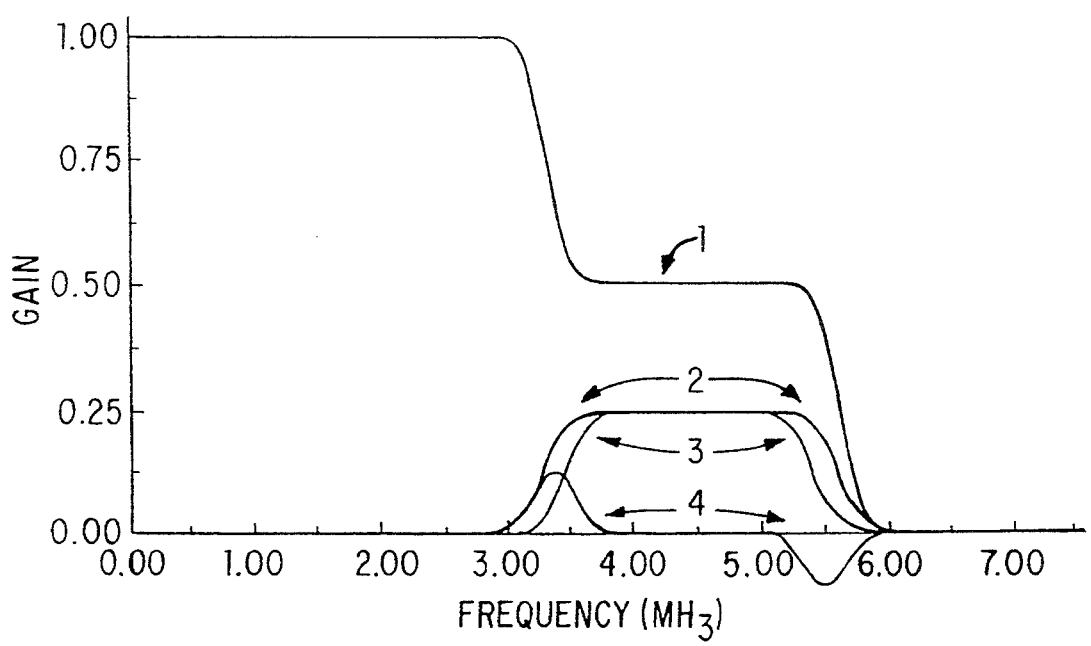
FIG. 10 shows overall frequency responses under four test conditions.

The frequency responses of F, F', L, & C are plotted in FIG. 9, and the responses to the 4 conditions are plotted in FIG. 10. These all have the required symmetries.

The embodiments described have shown how the performance of W-PAL assemblers and splitters may be improved by replacing the band pass filters by high-pass filters and carefully controlling the 5.5 MHz low-pass response. Perfect reconstruction can be achieved by including an extra low-pass filter to the chrominance paths.

The systems have been described in the context of system I PAL which has a signal bandwidth of 5.5 MHz. For other standards, such as system B, G PAL, each of which have a more narrow bandwidth filter values will change to reflect the requirements of the standard.

Although all components have been described as hardware functions it will be appreciated that many components may be implemented in software.

TABLE 1

| n | F | 2F' | C = 2-2F' | L = 2F'*C | X = 2F'/C | n |
|---|---|---|---|---|---|---|
| 0 | 0.50113001 | 0.81481481 | 1.18518519 | 0.83012545 | 0.80428630 | 0 |
| 1 | −0.31718302 | 0.17429602 | −0.17429602 | 0.16153705 | 0.18299562 | 1 |
| 2 | −0.00113374 | −0.14408171 | 0.14408171 | −0.13807952 | −0.14796352 | 2 |
| 3 | 0.10276085 | 0.10120565 | −0.10120565 | 0.10380232 | 0.09903282 | 3 |
| 4 | 0.00108629 | −0.05467880 | 0.05467880 | −0.06475741 | −0.04738152 | 4 |
| 5 | −0.05821633 | 0.01342785 | −0.01342785 | 0.02738762 | 0.00370514 | 5 |
| 6 | −0.00101066 | 0.01594800 | −0.01594800 | 0.00284880 | 0.02466798 | 6 |
| 7 | 0.03810340 | −0.03057337 | 0.03057337 | 0.02259775 | −0.03539842 | 7 |
| 8 | 0.00091139 | 0.03150254 | −0.03150254 | 0.03074706 | 0.03108108 | 8 |
| 9 | −0.02631009 | −0.02279729 | 0.02279729 | −0.02898073 | −0.01769853 | 9 |
| 10 | −0.00079626 | 0.00989407 | −0.00989407 | 0.02039933 | 0.00225878 | 10 |
| 11 | 0.01846892 | 0.00214577 | −0.00214577 | −0.00888795 | 0.00950032 | 11 |
| 12 | 0.00067085 | −0.00995010 | 0.00995010 | −0.00195479 | −0.01459587 | 12 |
| 13 | −0.01290995 | 0.01238126 | −0.01238126 | 0.00958180 | 0.01310021 | 13 |
| 14 | −0.00054294 | −0.01028752 | 0.01028752 | −0.01286906 | −0.00736618 | 14 |
| 15 | 0.00885111 | 0.00569773 | −0.00569773 | 0.01206422 | 0.00063848 | 15 |
| 16 | 0.00041914 | −0.00084233 | 0.00034233 | −0.00640175 | 0.00433260 | 16 |
| 17 | −0.00586641 | −0.00263780 | 0.00263780 | 0.00354868 | −0.00618142 | 17 |
| 18 | −0.00030547 | 0.00407094 | −0.00407094 | 0.00093788 | 0.00509191 | 18 |
| 19 | 0.00369221 | −0.00369465 | 0.00369465 | −0.00399756 | −0.00233561 | 19 |
| 20 | 0.00020629 | 0.00229186 | −0.00229186 | 0.00522649 | −0.00050324 | 20 |
| 21 | −0.00214529 | −0.00073582 | 0.00073582 | −0.00481766 | 0.00224131 | 21 |
| 22 | −0.00012445 | −0.00036144 | 0.00036144 | 0.00333026 | −0.00247604 | 22 |
| 23 | 0.00104535 | 0.00079292 | −0.00079292 | −0.00152481 | 0.00155324 | 23 |
| 24 | 0.00006115 | −0.00069577 | 0.00069577 | −0.00006628 | −0.00022787 | 24 |
| 25 | | | | 0.00107449 | −0.00150943 | 25 |
| 26 | | | | −0.00142235 | 0.00122905 | 26 |
| 27 | | | | 0.00124317 | −0.00063354 | 27 |
| 28 | | | | −0.00077665 | 0.00003690 | 28 |
| 29 | | | | 0.00026339 | 0.00035107 | 29 |
| 30 | | | | 0.00012696 | −0.00046390 | 30 |
| 31 | | | | −0.00032324 | 0.00035644 | 31 |
| 32 | | | | 0.00034052 | −0.00014663 | 32 |
| 33 | | | | −0.00024408 | −0.00004888 | 33 |
| 34 | | | | 0.00011057 | 0.00015754 | 34 |
| 35 | | | | 0.00000173 | −0.00016510 | 35 |
| 36 | | | | −0.00006473 | 0.00010204 | 36 |
| 37 | | | | 0.00007862 | −0.00001758 | 37 |
| 38 | | | | −0.00006014 | −0.00004613 | 38 |
| 39 | | | | 0.00003028 | 0.00006908 | 39 |
| 40 | | | | −0.00000471 | −0.00005472 | 40 |
| 41 | | | | −0.00000942 | 0.00002152 | 41 |
| 42 | | | | 0.00001254 | 0.00000972 | 42 |
| 43 | | | | −0.00000930 | −0.00002575 | 43 |
| 44 | | | | 0.00000423 | 0.00002402 | 44 |
| 45 | | | | −0.00000048 | −0.00001168 | 45 |
| 46 | | | | −0.00000113 | −0.00000113 | 46 |
| 47 | | | | 0.00000113 | 0.00000656 | 47 |
| 48 | | | | −0.00000048 | −0.00000334 | 48 |

I claim:

1. An assembler for a Weston Clean PAL (W-PAL) video signal transmission system in which a composite PAL video signal is formed from a luminance component Y(t) modulated at twice sub-carrier frequency and a chrominance component C(t) modulated at sub-carrier frequency and having sum (U+V) and differences (U−V) components on alternate lines, the assembler comprising:

(a) a video line delay means for delaying the luminance and chrominance components by one video line period;

(b) high pass filter means (F) for filtering the luminance and chrominance components; and (c) a compensating low pass filter means (X) for filtering the chrominance signal;

wherein the video line delay means, the high pass filter means (F) and the compensating filter means (X) are arranged to produce:

(d) delayed high pass filtered luminance components;

(e) undelayed high pass filtered luminance components;

(f) delayed high pass filtered chrominance components; and (g) undelayed chrominance components which are both high and low pass filtered;

the assembler further comprising:

(h) summing means for summing an undelayed and unfiltered luminance component together with the components (d) through (g) above; and (i) a further low pass filter means (L) for filtering the output of the summing means to form a W-PAL signal;

wherein the filter means L, X and F are chosen such that:

$$L \propto F^* (1 - F) \text{ and } X(f) = \frac{F(f)}{1 - F(f)}$$

where F′=F (2fsc−(f).

2. An assembler according to claim 1, wherein the high pass filter means F comprises:

(a) a first high pass filter arranged to filter the luminance components;

(b) a second high pass filter arranged to filter the chrominance components; and (c) an adder for adding the outputs of the first and second high pass filters;

wherein the output of the adder is connected to the video line delay means, so that the luminance and chrominance components are high pass filtered then delayed.

3. An assembler according to claim 2, wherein the compensating low pass filter means (X) receives an output from the second high pass filter, and the compensating low pass filter means (X) has an output to a subtracting means which subtracts the output of the compensation filter means from the undelayed luminance signal Y(t) to form an input to the summing means, wherein the output from the compensating filter is F*X*C(t), where F* and X* denote the operation of the high pass filter (F) and compensating low pass filter (X) respectively.

4. An assembler according to claim 1, wherein the video line delay means, the high pass filter means and the compensating low pass filter means (X) are rearranged such that the luminance and chrominance components are summed and the video line delay means is arranged to delay the summed luminance and chrominance components, the assembler further comprising a subtractor which subtracts:

(a) undelayed luminance components; and
(b) undelayed low pass filtered chrominance components; from
(c) the summed and delayed chrominance and luminance components;

to produce an output (Y(t−T)+C(t−T)−Y(t)−X*C(t)) for filtering by the high pass filter means (F), where:

(d) Y(t−T) denotes delayed luminance components;
(e) C(t−T) denotes delayed chrominance components;
(f) Y(t) denotes luminance components; and
(g) X*C(t) denotes low pass filtered chrominance components.

5. An assembler according to claim 1, wherein the delay means, the summing means and the further low pass, high pass and compensating low pass filter means are arranged such that the W-PAL output from the further low pass filter means is expressed as:

$$PAL(t)=L^* < Y(t)+F(Y(t-T)-Y(t)+C(t-T)-X^*C(t)) >$$

6. An assembler according to claim 1, wherein the high pass filter means (F) comprises a multi-tap FIR filter with raised cosine edges and having a cut off at (2fsc−B) where B is the video bandwidth of the PAL standard.

7. A W-PAL video signal coder having an assembler according to claim 1.

8. A splitter for a Weston Clean PAL (W-PAL) video signal receiver in which a W-PAL video signal is received and split to form a luminance component modulated at twice colour sub-carrier frequency and a chrominance component at sub-carrier frequency and comprising sum (U+V) and difference (U−V) components on alternate video lines, the splitter comprising:

(a) a video line delay means for delaying the received W-PAL signal by a video line period;
(b) high-pass filter means (F) for filtering the received W-PAL signal;
(c) and compensating low pass filter means (X) arranged to filter the delayed received W-PAL signal;

wherein the line delay means, the compensating low pass filter means and the high pass filter means are arranged to provide:

(d) an output luminance component comprising a delayed unfiltered W-PAL component, delayed W-PAL components filtered by the high pass filter means, and undelayed W-PAL components filtered by the high pass filter means; and
(e) an output chrominance component comprising an undelayed high pass filtered W-PAL component and a delayed high pass filtered W-PAL component which compensating low pass filtered, wherein the filter means X and F are chosen such that:

$$L \propto F^* (1 - F') \text{ and } X(f) = \frac{F(f)}{1 - F'(f)}$$

where F'=F(2fsc−(f)) and L is a low pass filter arranged in the transmission channel.

9. A splitter according to claim 8, wherein the video line delay means (T), the compensating low pass filter means (X) and the high-pass filter means are arranged such that the output luminance and chrominance components are $$Y'(t)=PAL\ (t-T)+F(PAL\ (t)-PAL\ (t-T))$$

and $$C'(t)=F(PAL\ (t)-X^*PAL\ (t-T))$$

where PAL (t) is the received W-PAL signal.

10. A splitter according to claim 9, wherein the chrominance output is provided from a subtractor which subtracts from the high pass filtered received signal F* PAL(t), the delayed high pass filtered signal which is also compensating low pass filtered F*X* PAL (t−T).

11. A splitter according to claim 10, wherein the luminance output is provided by a subtractor which subtracts from the sum of the delayed received signal (PAL(t−T)) and the high-pass filtered undelayed received signal F*PAL(t), the delayed high-pass filtered received signal F*PAL(t−T).

12. A splitter according to claim 8, wherein the high-pass filter means (F) comprises a multi-tap FIR filter with raised cosine edges and having a cut-off at (2fsc−B) where B is the video bandwidth of the PAL standard.

13. A W-PAL video signal decoder comprising a splitter according to claim 8.

14. A Weston Clean PAL video signal system comprising at a transmitter:

a coder in which a composite PAL video signal is formed from a luminance signal modulated at twice sub-carrier frequency and a chrominance signal modulated at sub-carrier frequency and having sum (U+V) and difference (U−V) components on alternate lines, the coder comprising an assembler comprising:

(a) a video line delay means for delaying the luminance and chrominance components by one video line period
(b) high pass filter means (F) for filtering the luminance and chrominance components and
(c) a compensating low pass filter means (X) for filtering the chrominance signal wherein the video line delay means, the high pass filter means (F) and the compensating filter means (X) are arranged to produce;
- (d) delayed high pass filtered luminance components
- (e) undelayed high pass filtered luminance components;
- (f) delayed high pass filtered chrominance components; and
- (g) undelayed chrominance components, which are both high and low pass filtered the assembler further comprising:
- (h) summing means for summing an undelayed and unfiltered luminance component together with the components (d) through (g) above; and
- (i) a further low pass filter means (L) for filtering the output of the summing means to form a W-PAL signal, wherein the filter means L, X and (F) are chosen such that $$L \propto F * (1 - F') \text{ and } X(f) = \frac{F(f)}{1 - F'(f)}$$

where $F' = F(2fsc - (f))$
and at a receiver;
a W-PAL decoder comprising a splitter comprising:
- (j) a video line delay means for delaying the received W-PAL signal by a video line;
- (k) high-pass filter means (F) for filtering the received W-PAL signal;
- (l) compensating low pass filter means (X) arranged to filter the delayed received W-PAL signal;

wherein the line delay means, the compensating low pass filter means and the high pass filter means are arranged to provide:
- (m) an output luminance component comprising a delayed unfiltered W-PAL component; delayed W-PAL components filtered by the high pass filter means; and undelayed W-PAL components filtered by the high pass filter means; and
- (n) an output chrominance component comprising an undelayed high pass filtered W-PAL component and a delayed high pass filtered W-PAL component which is also compensating low pass filtered wherein the filter means X and F are as chosen for the transmitter.

* * * * *